(12) United States Patent
Martin et al.

(10) Patent No.: US 11,293,789 B2
(45) Date of Patent: Apr. 5, 2022

(54) SELF-LOCATING MECHANICAL INTERFACE FOR A SENSOR ON A GAS METER

(71) Applicant: Natural Gas Solutions North America, LLC, Houston, TX (US)

(72) Inventors: Jeff Thomas Martin, Spring, TX (US); Roman Leon Artiuch, Houston, TX (US); Jeffrey Raynal, Katy, TX (US); Richard Jin Yao, The Woodlands, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 123 days.

(21) Appl. No.: 16/718,505

(22) Filed: Dec. 18, 2019

(65) Prior Publication Data

US 2020/0200574 A1 Jun. 25, 2020

Related U.S. Application Data

(60) Provisional application No. 62/781,468, filed on Dec. 18, 2018.

(51) Int. Cl.
*G01F 1/075* (2006.01)
*G01F 1/115* (2006.01)

(52) U.S. Cl.
CPC .......... *G01F 1/0755* (2013.01); *G01F 1/1155* (2013.01)

(58) Field of Classification Search
CPC ........ G01F 1/115; G01F 1/1155; G01F 1/075; G01F 1/0755
See application file for complete search history.

(56) References Cited

U.S. PATENT DOCUMENTS

| | | | |
|---|---|---|---|
| 6,191,687 B1 | 2/2001 | Dlugos et al. | |
| 6,692,572 B1 | 2/2004 | Allen | |
| 7,735,381 B2 * | 6/2010 | Lodolo | ............... G01F 25/0007 73/861.79 |
| 8,863,262 B2 | 10/2014 | Katzer et al. | |
| 2015/0153203 A1 | 6/2015 | Simon et al. | |
| 2016/0003653 A1 | 1/2016 | Efimov | |
| 2016/0042269 A1 * | 2/2016 | Wang | ..................... G01F 15/07 346/33 R |
| 2019/0101426 A1 | 4/2019 | Artiuch | |

FOREIGN PATENT DOCUMENTS

JP 2006058267 A * 3/2006

* cited by examiner

*Primary Examiner* — Erika J Villaluna
(74) *Attorney, Agent, or Firm* — Paul Frank + Collins P.C.

(57) ABSTRACT

A sensor unit that is configured to improve the non-contact, magnetic interface on a gas meter. The configurations may include a pair of magnets that co-rotate in response to a magnet internal to the gas meter. At least one of the magnets may also move longitudinally in proximity to the internal magnet. This feature aligns the magnets with one another to ensure proper magnetic coupling with the internal magnet.

18 Claims, 9 Drawing Sheets

SELF-LOCATING MECHANICAL INTERFACE FOR A SENSOR ON A GAS METER

CROSS-REFERENCE TO RELATED APPLICATIONS

This application claims the benefit of U.S. Ser. No. 62/781,468, filed on Dec. 18, 2018, and entitled "SELF-LOCATING MECHANICAL INTERFACE FOR A SENSOR ON A GAS METER." The content of this application is incorporated by reference herein in its entirety.

BACKGROUND

Utilities may employ flow meters to measure customer consumption of resources, like water or natural gas. In the past, gas meters made use of mechanical "counters" to meter consumption of fuel gas. These counters leverage gears and other mechanisms to harness flow of the fuel gas into an essentially immutable measure of consumption. Advances in technology now allow for electronics to replace these counter mechanisms. Newer units may incorporate a non-contact "interface" that conveys mechanical movement to electronics, often in the form of digital signals or pulses. These interfaces maintain physical integrity of the gas meter. However, manufacturing inaccuracies or tolerances may frustrate use of some of these technologies or, at least, require more costs (in time and labor) to assemble and ensure the device works properly and within acceptable reliably and accuracy ranges.

SUMMARY

The subject matter of this disclosure relates to improvements to these non-contact interfaces. Of particular interest herein are embodiments that provide "play" or "float" in the devices of the interface. This feature may ensure proper interaction among the devices without end user (e.g., technician) intervention. These embodiments may take advantage of underlying properties, like magnetics, that the devices use to convert mechanical movement into signals that form the basis for measurement of flow. On gas meters (or like metrology hardware), the proposed design may serve as a "bridge" between electronics and a meter body, which incorporates mechanics (e.g., impellers, diagrams, etc.) that meter precise volumes of the fuel gas. The "bridge" coverts movement of the mechanics into digital pulses or other signal(s) that the electronics can use to generate values volumetric flow. Utilities use these values to accurately bill their customers.

DRAWINGS

Reference is now made briefly to the accompanying drawings, in which.

Figure 1:
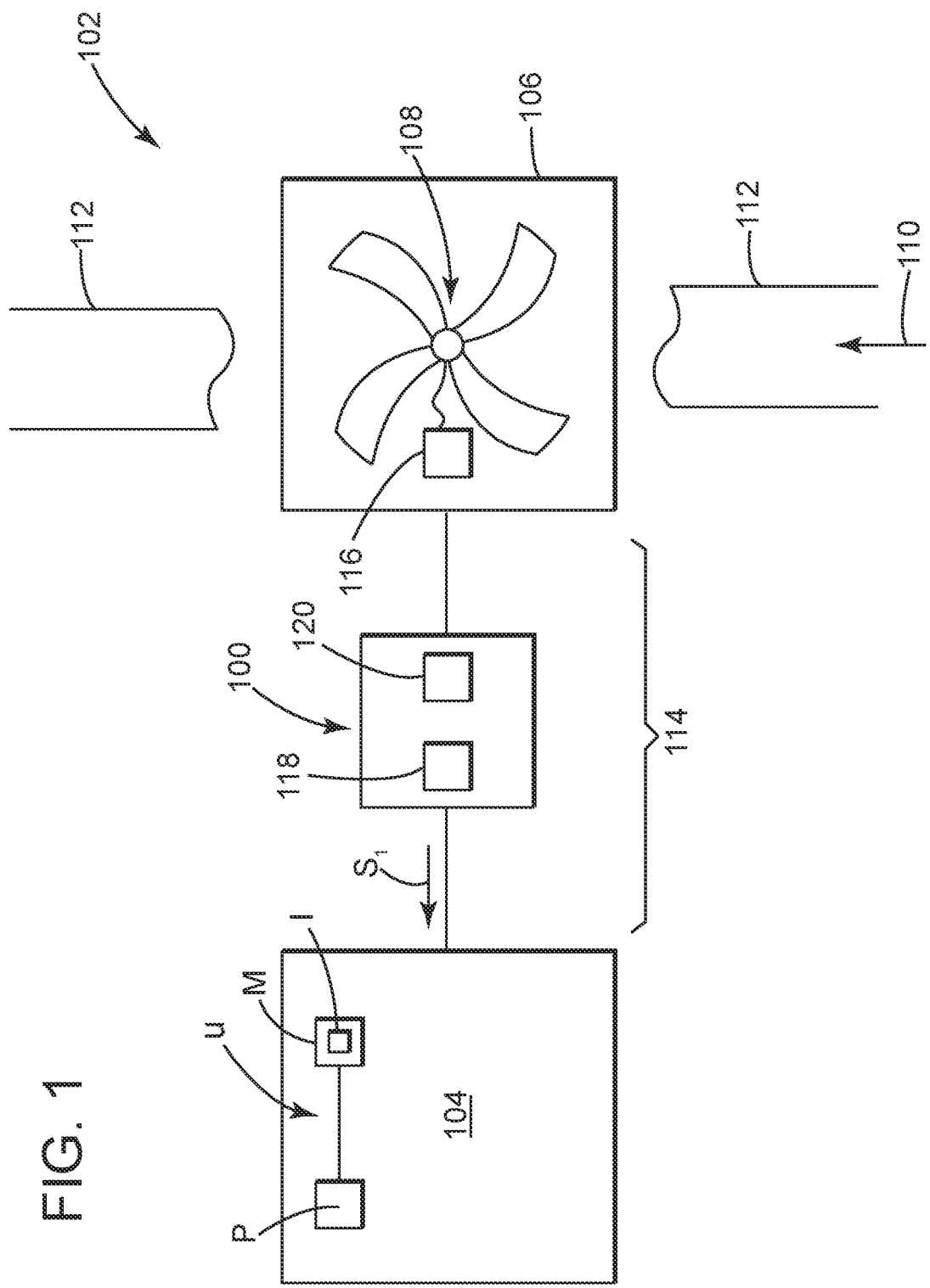
FIG. 1 depicts a schematic diagram of an exemplary embodiment of a sensor unit.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion now turns to describe various features found in the drawings above. These features may form part of a sensor unit or "mag-pickup" that facilitates use of non-contact technology to quantify flow in positive-displacement flow meters. The mag-pickup employs a design that accounts for manufacturing inaccuracies, tolerances, or other dimensions, all of which can frustrate use of non-contact modalities necessary to maintain physical integrity or structure of the flow meter. As noted herein, the design below leverages magnetics to take up slack in certain dimensions as means to ensure proper sensing interactions and, thus, avoids problems that might frustrate use of the mag-pickup to accurately and reliability quantify flow on the unit. Other embodiments are within the scope of the disclosure as well.

FIG. 1 schematically depicts an example of a sensor unit 100. This example incorporates into a flow meter, identified generally by the numeral 102. The flow meter 102 may embody metrology hardware, like gas and water meters. These devices may quantify flow of resources (e.g., fuel gas, water, etc.). The gas meter 102 may have an electronics unit 104 that attaches to a meter unit 106. Mechanics 108 may reside inside of the meter unit 106. For this example, mechanics 108 may embody a pair of impellers that counter-rotate in response to flow of material 110 through the meter unit 106, typically from conduit 112. The sensor unit 100 may be part of a sensing system 114 that can generate signals that reflect rotation of the impellers 108. The sensing system 114 may utilize non-contact technologies, like magnetics; however, other types of modalities (e.g., ultrasonic or piezo-electric) may be useful as well. In one implementation, the sensing system 114 may include an emitter 116, like a magnet that rotates concomitantly with the impellers 108. A sensor 118 can generate a signal $S_1$, for example, digital pulses that correspond with movement of the rotating "impeller" magnet 116. Electronics in the form of a processing unit U (including processor P, memory M, and executable instructions I) in the electronics unit 104 can process the digital pulses Si to quantify volumetric flow of material 110, among other capabilities. The processing unit U may embody a microprocessor or fully-integrated integrated circuit (IC). As also shown, the sensor unit 100 may have a motion-transfer unit 120 that couples the emitter 116 to the sensor 118.

Figure 2:
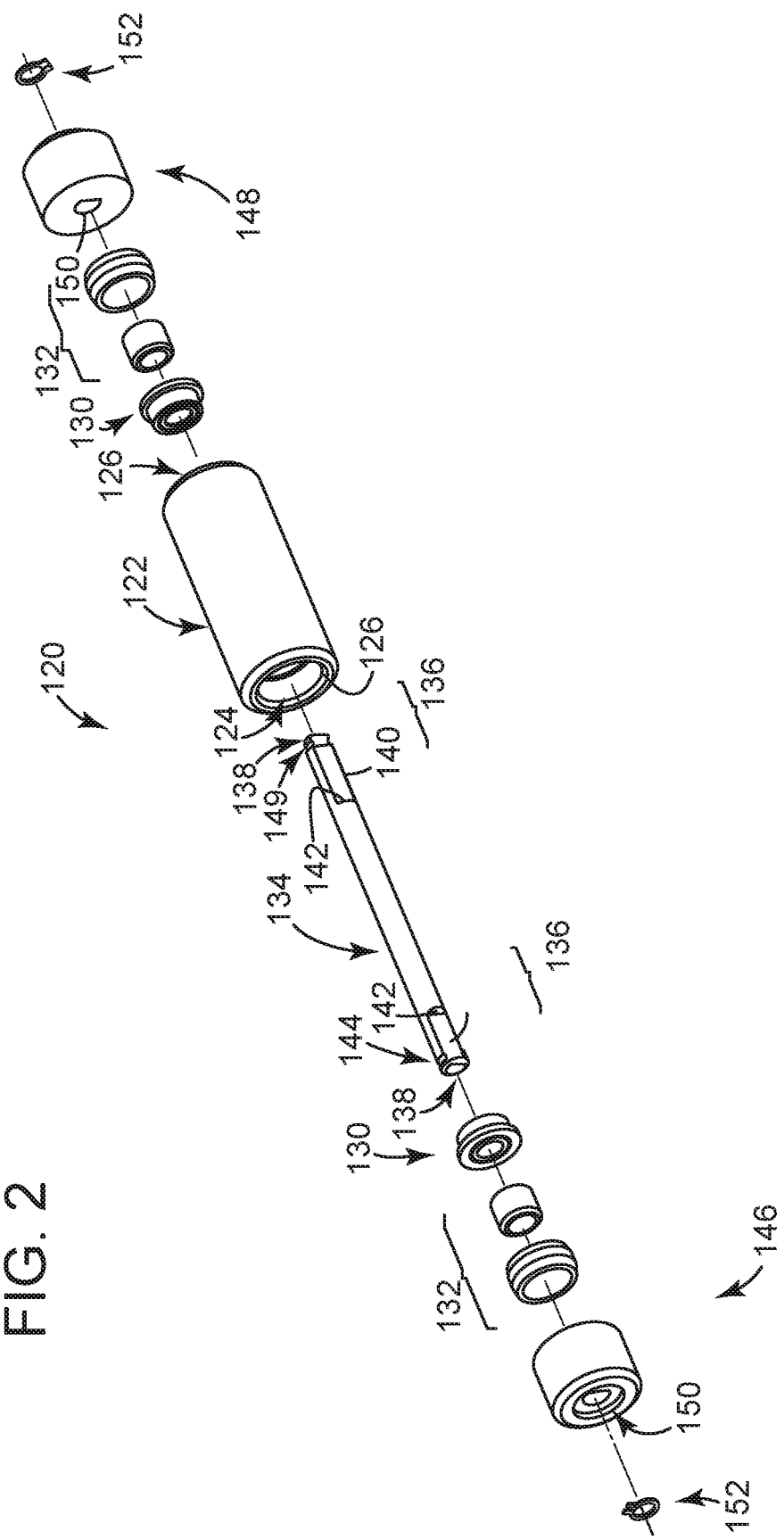
FIG. 2 depicts a perspective view of an example of a motion-transfer unit in partially-exploded form, the motion-transfer unit for use in the sensor unit of FIG. 1.

FIG. 2 depicts a perspective view of an example of the motion-transfer unit 120 in exploded form. This example includes a cylindrical body 122, typically made of plastic or metal. The cylindrical body 122 may have a through-bore 124 that terminates at counter-bores 126 on either end 128. The motion-transfer unit 120 may also include a pair of bearing units, shown here as a combination of a radial bearing 130 and one or more bushings 132. The device may also have a shaft 134 with prepared sections 136 on either end 138. The prepared sections 136 may have geometry with a flat 140 that terminates at a shoulder 142. A groove 144 may circumscribe at least part of shaft 134, preferably at or near the terminal ends 138. As also shown, the motion transfer unit 120 may include a pair of magnets (e.g., a first magnet 146 and a second magnet 148), preferably annular or cylindrical in shape with an outer diameter that does not exceed than the outer diameter of the cylindrical body 122. The magnets 146, 148 may have a central bore 150 with geometry similar to that of the prepared sections 136 on the shaft 134. The device may also benefit from clips 152, like e-clips or similar spring retention devices.

Figure 3:
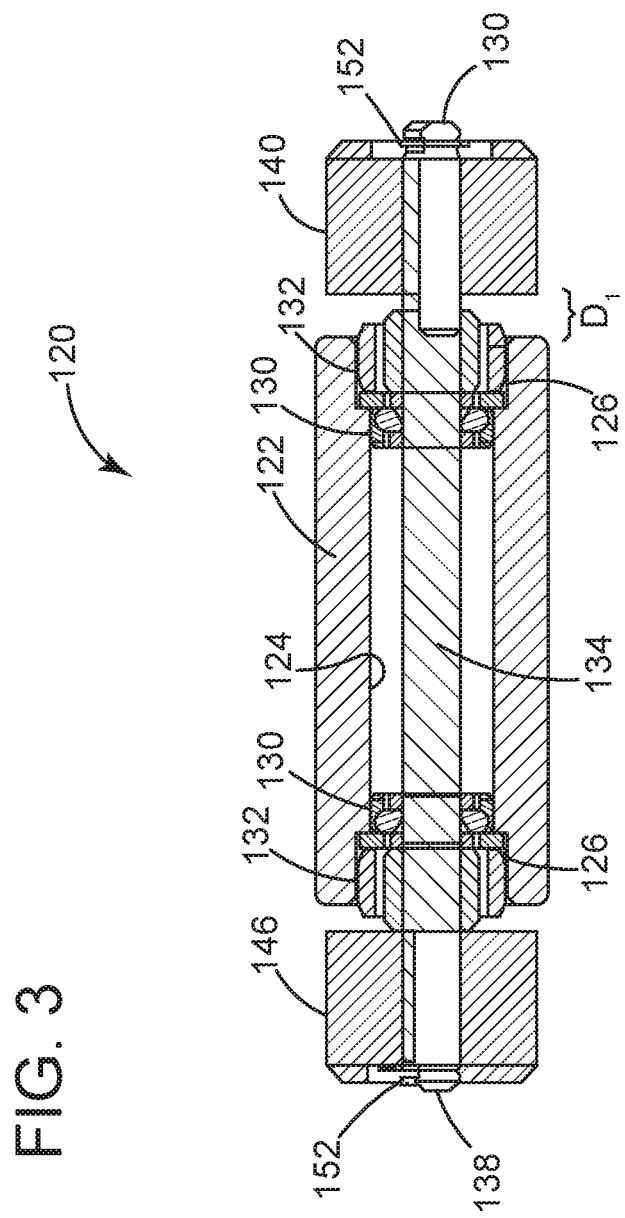
FIG. 3 depicts an elevation view of the cross-section of the motion-transfer unit of FIG. 2 in assembled form.

FIG. 3 depicts an elevation view of the cross-section of the motion-transfer unit 120 of FIG. 2 in assembled form. The bearing units 130, 132 may reside in the bores 124, 126. The shaft 134 inserts into the bearing units 130, 132 so that the ends 144 with the prepared sections 136 reside outside of the cylindrical body 122. The bearings 130 permit the shaft 134 to rotate relative to the cylindrical body 122. In most cases, this construction does not allow the shaft 134 to translate along the axis of the cylindrical body 122; however, this is not always the case. It may benefit the design for the shaft 134 to translate longitudinally on the axis. Magnets 146, 148 may slide onto the prepared sections 136. A loose fit may prevail between the inner surface of the central bore 150 and the outer surface of the shaft 134. The shoulder 142 may act to stop progress down the shaft 134. Mating flats 140 prevent changes in radial orientation of the magnets 146, 148 on the shaft 134 as well. This feature also "keys" the magnets 146, 148 relative to one another, which may ensure that magnetic poles on these devices align with one another. Clips 152 may secure at the grooves 144 to keep the magnets 146, 148 on the shaft 134. As shown, the shaft 134 may reside in the bearings 130, 132 so that the first magnet 146 resides in close proximity to the cylindrical body 122. The location of the shaft 134 may also create a gap $D_1$ between the second magnet 146 and the cylindrical body 122. The gap Di in combination with the loose fit will permit the second magnet 146 to translate or "float" longitudinally along the shaft 134. If the shaft 134 remains stationary, then the second magnet 148 can move independent of the shaft 134 to reduce the gap $D_1$. Other embodiments may have the shaft 134 and magnets 146, 148 move together to reduce the gap $D_1$ on one side of the cylindrical body 122 and increase the gap $D_1$ on the other side.

Figure 4:
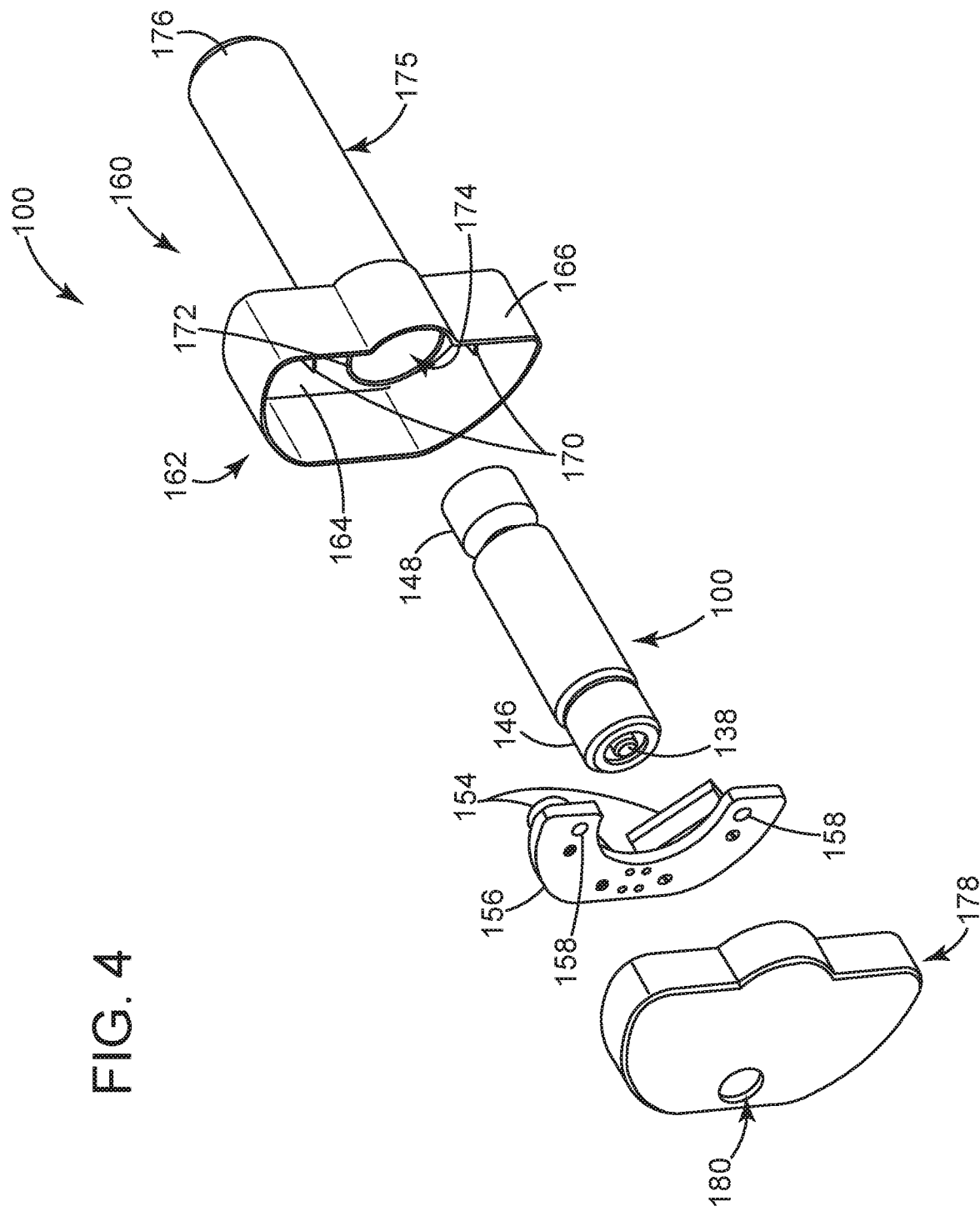
FIG. 4 depicts a perspective view of an example of the sensor unit of FIG. 1 in partially exploded form.

FIG. 4 depicts a perspective view of additional structure for the sensor unit 100 of FIG. 1 in partially-exploded form. The sensor 118 may embody a Weigand device 154, although this disclosure contemplates use of other devices like Hall effect sensors, Reed switch sensors, encoders, or other technologies known now or developed after the date of filing. The Weigand device 154 may reside on a substrate 156, for example, a printed circuit board or like internally-circuitized member. The PCB 156 may connect various discrete components including computing components (processor, memory, etc.), electrical components (resistors, capacitor, batteries, etc.), and the like. Alignment features, like holes 158, may benefit the design to receive or engage with corresponding features on a housing 160 that is made from plastics or composites (although metal may work as well). The housing 160 may have a receiving unit 162 with a bottom wall 164 and a peripheral wall 166 that combine to form a recess 168. Pins 170 may protrude into the recess 168 from the bottom wall 164. The pins 170 may be diametrically opposed on opposite sides of a cylindrical wall 172 that forms a bore 174 that aligns with a hollow tube 175, which extends from the backside of the bottom 164 to a closed distal end 176. As also shown, the sensor unit 100 may benefit from a cover 178 with an opening 180.

Figure 5:
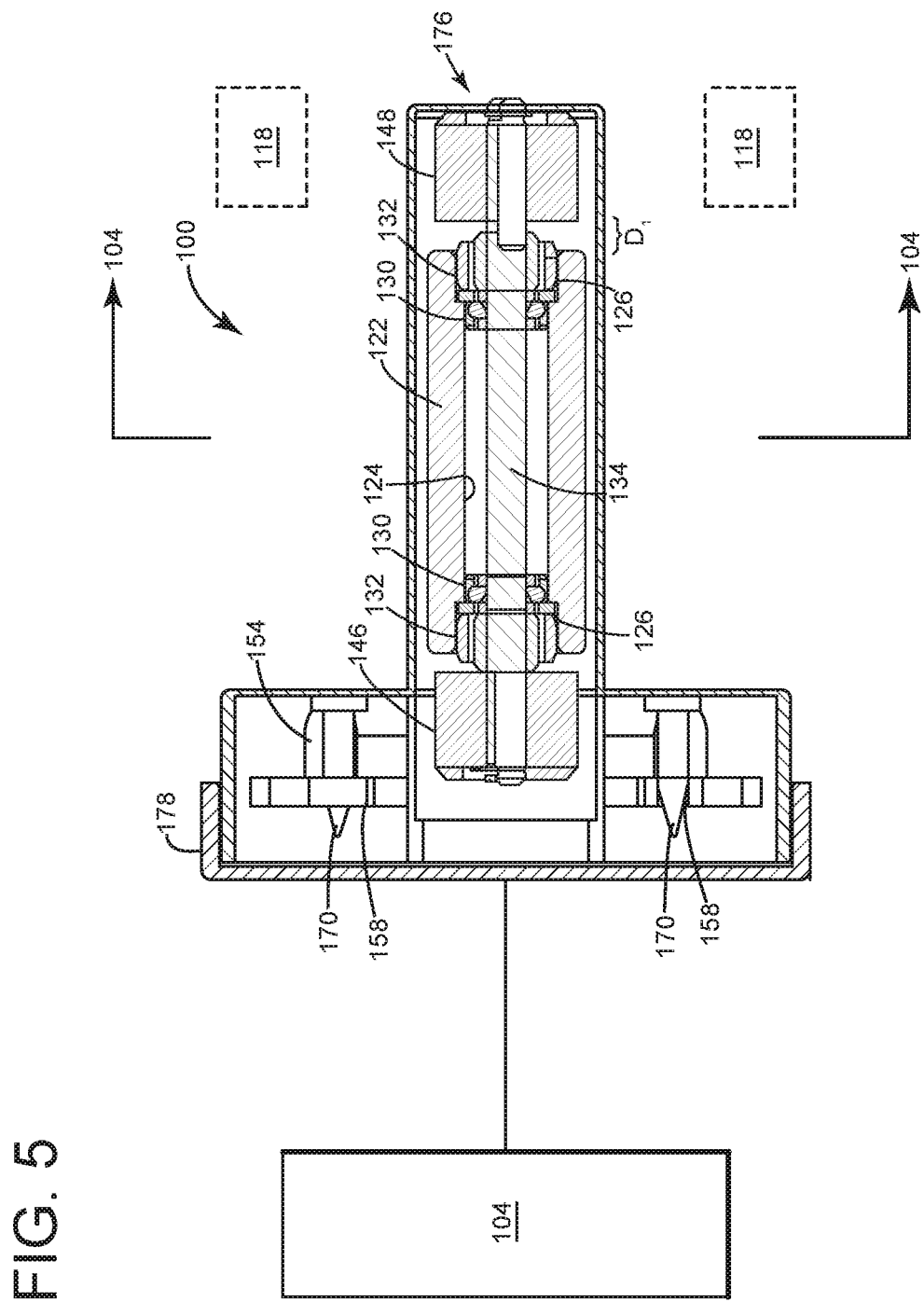
FIG. 5 depicts an elevation view of the cross-section of the sensor unit of FIG. 4 in assembled form.

FIG. 5 depicts an elevation view of the cross-section of the sensor unit 100 of FIG. 4 in assembled form. The motion-transfer unit 120 inserts into the bore 174 to reside in the hollow tube 175. The terminal end 138 of the shaft 134 may contact the closed distal end 176. Dimensions may provide for a slight press or interference fit between the outer diameter of the cylinder body 122 and the inner diameter of the bore 174 (and hollow tube 175). Holes 158 on the PCB 156 align with the pins 170 to allow for proper positioning of the Weigand device 154. Potting or adhesive may be used to secure the PCB 156 in position. The cover 178 can secure to the peripheral wall 166 with fasteners (e.g., screws) or, more likely, a releaseable clasp or snap-fit connection. The opening 180 may allow for wires or other connections from the PCB 156 to exit the sensor unit 100 to facilitate transfer of the digital pulses Si to the electronics unit 104.

The sensor unit 100 may install into the gas meter 102 to monitor rotation of the impellers 108. As shown, the distal end 176 of the hollow tube 174 may insert into the meter unit 104 to locate the second magnet 148 in close proximity to the rotating "impeller" magnet 118. The second magnet 148 may have a polarity that forms an attractive force with the impeller magnet 118. This attractive force serves two purposes. First, when the impeller magnet 118 rotates (in response to flow across the impellers 108), the second magnet 148 will cause the first magnet 146 to rotate via the shaft 138. The Weigand device 154 generates digital pulses in response to the movement of the first magnet 144, which the electronics unit 104 can translate into volumetric flow. As an added benefit, the attractive force will also act to move or translate the second magnet 148 on the shaft 138. The "float" between the second magnet 148 on the shaft 138 provides enough longitudinal "play" for the second magnet 148 to self-locate to ensures proper magnetic coupling with the impeller magnet 118 internal to the meter unit 104.

Figure 6:
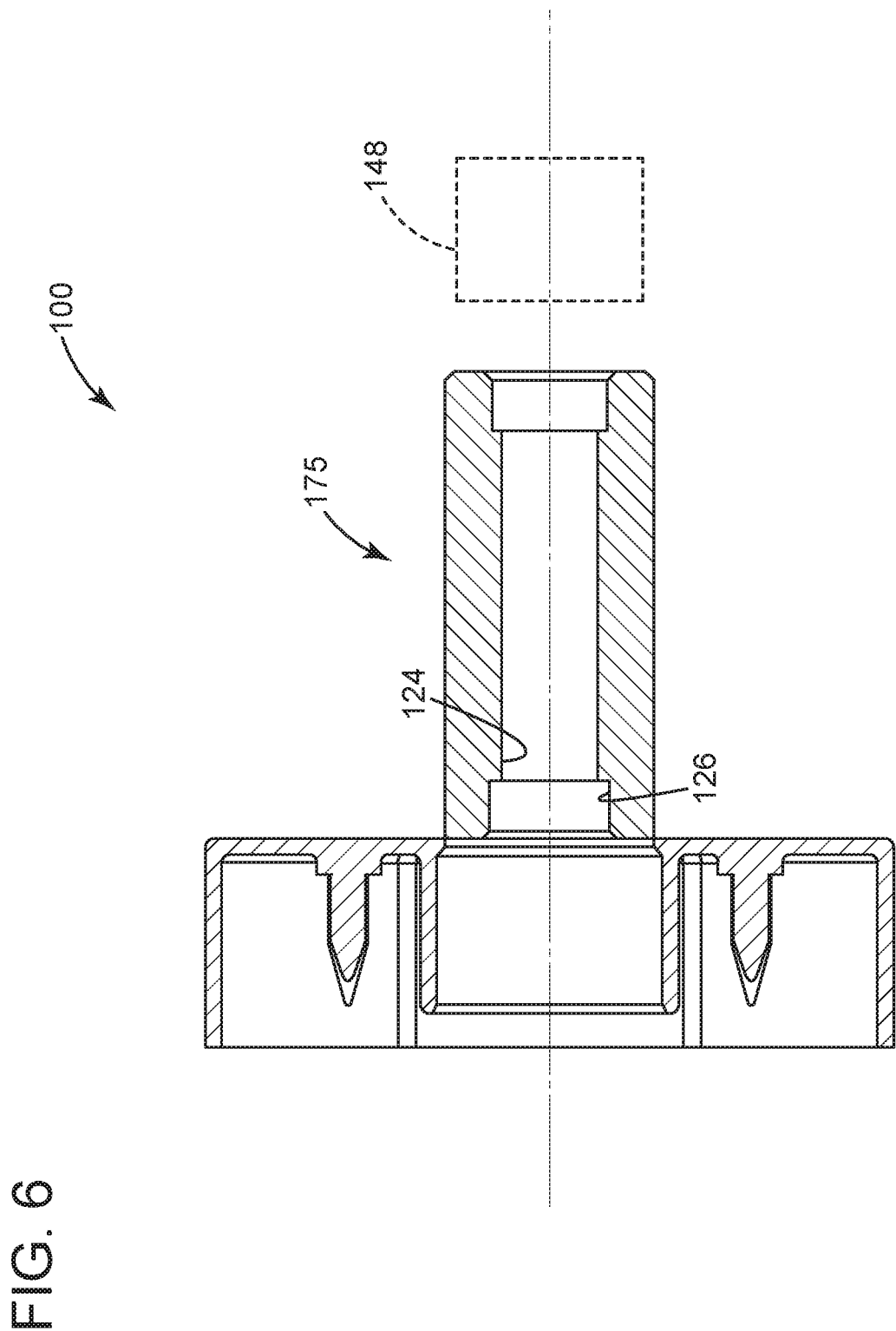
FIG. 6 depict an elevation view of the cross-section of an example of a housing for use with the sensor unit of FIG. 4.

FIG. 6 depicts an elevation view of the cross-section of another example of the sensor unit 100 of FIG. 1. Parts have been removed for clarity. In this example, the hollow tube 175 incorporates the features of the cylindrical body 122. These feature may include the bores 124, 126 to receive the bearing units 130, 132. In this configuration, the second magnet 148 may reside outside of the housing 160. But this construction may simplify manufacture because it eliminates the cylindrical body 122 from the design.

Figure 7:
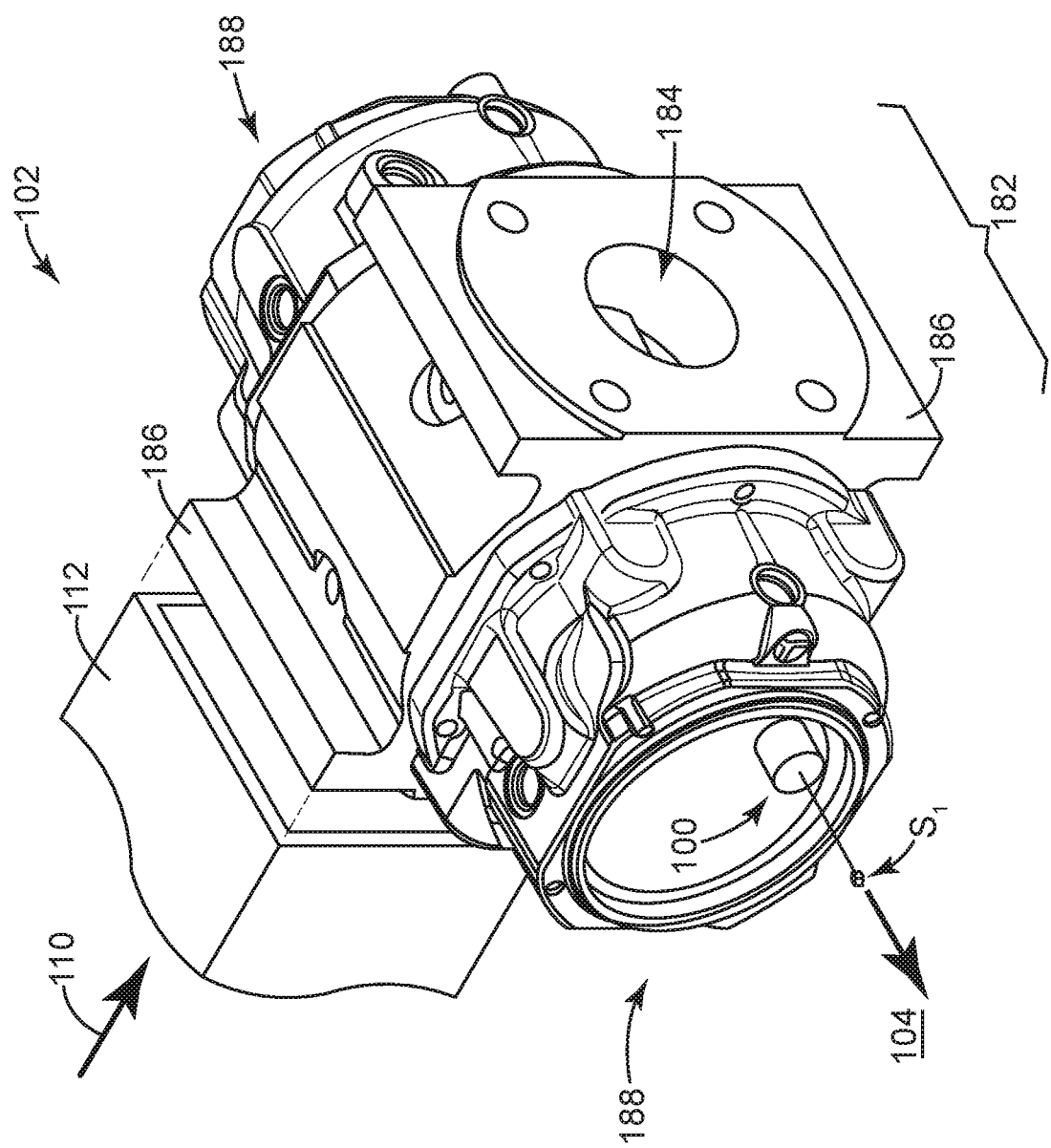
FIG. 7 depicts a perspective view of an example of the sensor unit of FIG. 1 on a meter unit for use on a gas meter.

FIG. 7 depicts a perspective view of an example of the sensor unit 100 resident on exemplary structure for the gas meter 102. This structure may include a meter body 182, typically of cast or machined metals. The meter body 182 may form an internal pathway that terminates at openings 184 with flanged ends 186. The ends 186 may couple the meter body 182 in-line with the conduit 112. As also shown, the meter body 182 may have covers 188 disposed on opposing sides of the device. The sensor unit 100 may mount to one of the covers 188, typically inserting into an aperture or recess in the cover 188 to communicate with the internal rotating magnet 118 (or other emitter) found inside the meter body 182. Fasteners, like adhesives or potting materials, may provide secure attachment without interfering with operation of the device.

Figure 8:
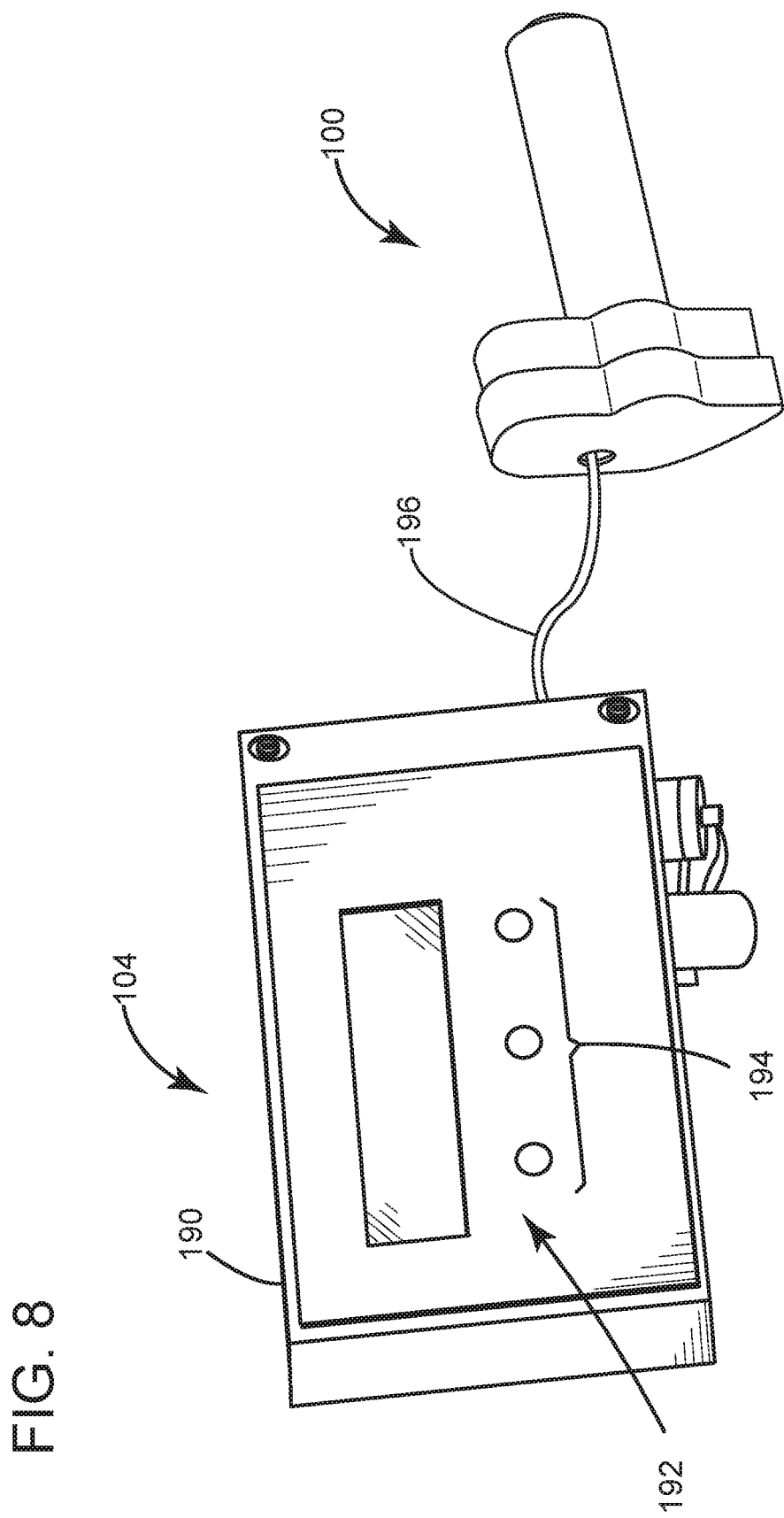
FIG. 8 depicts a perspective view of an example the sensor unit of FIG. 4 on an electronics unit for use on a gas meter.

FIG. 8 depicts a perspective view of the sensor unit 100 of FIG. 5 resident on exemplary structure for the electronics unit 104. This structure includes an index housing 190, typically made of plastics and operating generally as an enclosure to contain and protect electronics (discussed generally above). The index housing 190 may support a display 192 and user actionable device 194, for example, one or more depressable keys an end user uses to interface with interior electronics to change the display 192 or other operative features of the device. A cable assembly 196 may connect the sensor unit 100 to these electronics.

Figure 9:
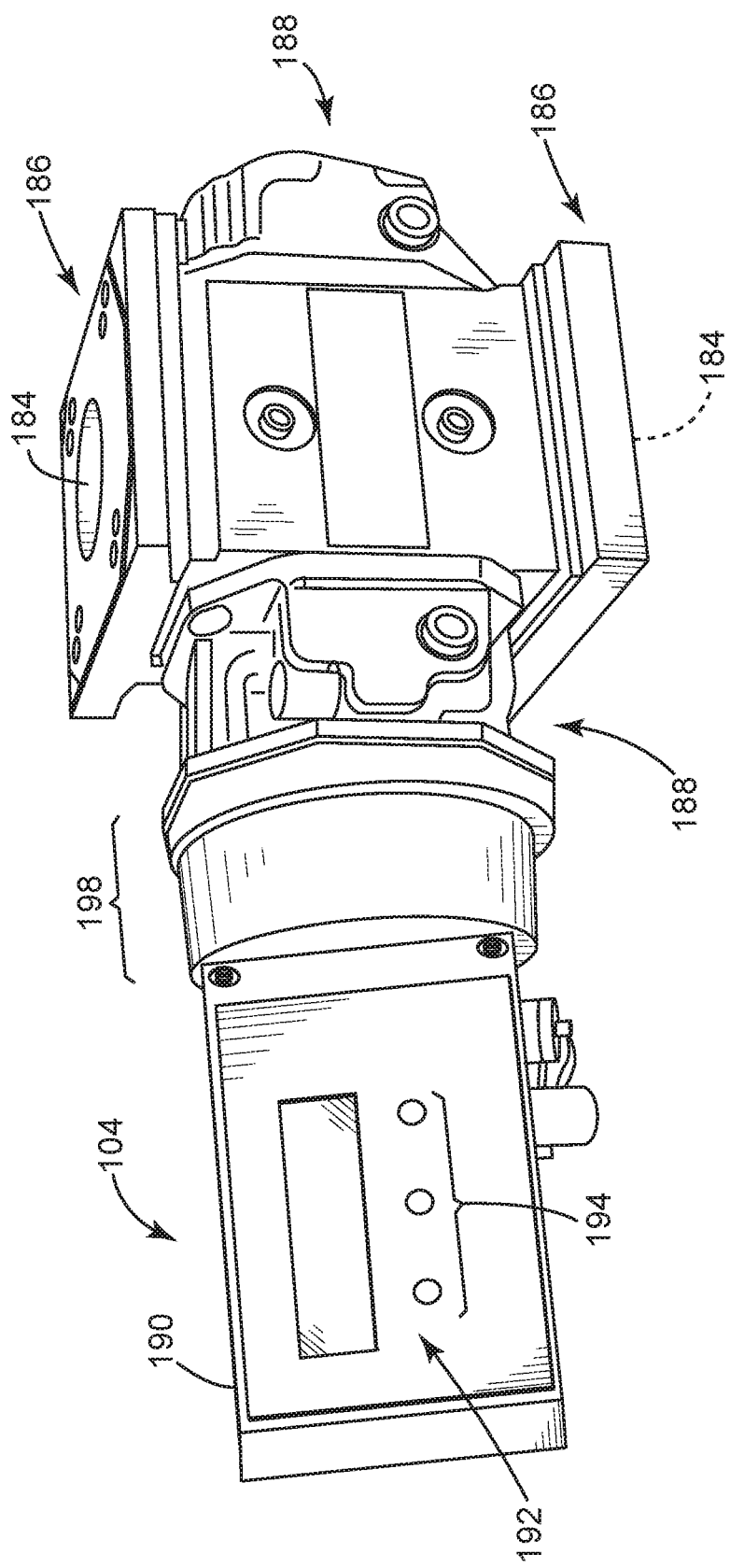
FIG. 9 depicts a perspective view of an example of a gas meter that incorporates the meter unit and electronics unit of FIGS. 7 and 8.

FIG. 9 depicts a perspective view of the gas meter 102 in the preceding FIGS. 7 and 8. One of the covers 190 may feature a connection 198, possibly flanged or prepared to interface with the index housing 190.

In light of the foregoing, the embodiments here improve fit-and-function of the mag-pickup to avoid potential inaccuracies in the field. This proposed design may eliminate alignment issues that result from dimension or tolerance stack up, for example, as between the electronics unit and meter body on gas meters. These issues can frustrate use of the gas meters to meet accuracy demands without proper and potentially time-consuming setup prior to installation in the field. On the other hand, the improvements here foreclose the need for special attention to assembly of the gas meter in lieu self-locating features that may ensure proper alignment of components strategic to quantifying volumetric flow in gas meters.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A flow meter, comprising:
   a meter body having a rotating magnet;
   electronics coupled with the meter body; and
   a sensor unit coupled with the electronics, the sensor unit comprising a non-contact sensor and a motion-transfer unit that conveys movement of the rotating magnet to the non-contact sensor,
   wherein the motion-transfer unit comprises a first magnet that translates longitudinally in response to proximity to the rotating magnet.

2. The flow meter of claim 1, wherein the motion-transfer unit comprises a second magnet that rotates concomitantly with the rotating magnet in the meter body.

3. The flow meter of claim 1, wherein the motion-transfer unit comprises a shaft that rotates concomitantly with the rotating magnet.

4. The flow meter of claim 1, wherein the motion transfer unit comprises:
   a shaft; and
   a second magnet disposed on the shaft and spaced apart from the first magnet so that the first magnet resides proximate the rotating magnet and one of the second magnet resides proximate the non-contact sensor.

5. The flow meter of claim 1, wherein the motion-transfer unit comprises:
   a shaft; and
   a second magnet disposed on an opposite end of the shaft as the first magnet.

6. A gas meter, comprising:
   a meter body with impellers disposed therein;
   a first magnet co-rotating with the impellers;
   a second magnet in proximity to the first magnet,
   a third magnet spaced part from the second magnet and axially aligned with the same, and
   a non-contact sensor proximate the third magnet,
   wherein the second magnet and the third magnet rotate concomitantly with the first magnet in response to rotation of the impellers, and
   wherein the second magnet has a polarity that causes it to translate longitudinally in proximity to the first magnet.

7. The gas meter of claim 6, further comprising:
   a shaft connecting the second magnet and the third magnet, wherein the second magnet is configured to translate longitudinally relative to the third magnet in proximity to the first magnet.

8. The gas meter of claim 6, further comprising:
   a shaft having flats on either end, wherein the second magnet and the third magnet have a central bore with geometry to engage the flats to prevent rotation of the second magnet and the third magnet independent of the shaft.

9. The gas meter of claim 6, further comprising:
   a two-piece housing enclosing the second magnet, the third magnet, and the non-cont act sensor.

10. The gas meter of claim 6, further comprising:
    a cover disposed on the meter body, wherein the first magnet and the second magnet are on opposite sides of the cover.

11. The gas meter of claim 6, further comprising:
    an electronics unit coupled with the meter body; and
    a cable connecting the electronics unit to the non-contact sensor.

12. The gas meter of claim 6, wherein the non-contact sensor comprises a Wiegand device.

13. An electronics unit for quantifying volume flow in a gas meter, the electronics unit comprising:
    a sensor unit comprising a shaft, a pair of magnets, one each disposed on opposite ends of the shaft, and a non-contact sensor disposed proximate one of the magnets, wherein the magnet on the end of shaft opposite the non-contact sensor is moveable along the shaft in response to a magnetic field.

14. The electronics unit of claim 13, wherein the sensor unit comprises:
    a housing having an hollow tube to receive the shaft and magnets.

15. The electronics unit of claim 13, further comprising:
a housing;
a processing unit disposed in the housing, the processing unit having executable instructions for converting digital pulses from the sensor unit into values for volumetric flow; and
a cable assembly extending outside of the housing to the sensor unit.

16. The electronics unit of claim 13, wherein the shaft and magnets have geometry that prevents rotation of the magnets independent of the shaft.

17. The electronics of claim 13, wherein the shaft and magnets have a flat that mates with one another to prevent rotation of the magnets independent of the shaft.

18. The electronics of claim 13, wherein the sensor unit comprises:
a cylindrical body having an bore;
bearings disposed in the bore,
wherein the shaft resides in the bearings and the magnets are disposed on either end of the cylindrical body.

* * * * *